UNITED STATES PATENT OFFICE.

JOHAN HERMAN VIERDAG, WILLEM JAN HUBERT VERHEGGEN, ROBERT HENDRIK ARNTZENIUS, AND ANTOON FRANS JOSEPH BYVOET, OF BREDA, NETHERLANDS.

PROCESS OF PRESERVING EGGS.

SPECIFICATION forming part of Letters Patent No. 687,490, dated November 26, 1901.

Application filed April 15, 1901. Serial No. 55,991. (No specimens.)

*To all whom it may concern:*

Be it known that we, JOHAN HERMAN VIERDAG, WILLEM JAN HUBERT VERHEGGEN, ROBERT HENDRIK ARNTZENIUS, and ANTOON FRANS JOSEPH BYVOET, subjects of the Queen of the Netherlands, and residents of Breda, Netherlands, have invented certain new and useful Improvements in Processes of Preserving Eggs and other Aliments, of which the following is a specification.

The object of the present invention is a process for preserving eggs and other aliments.

If only formaline is used to preserve eggs, it has to be used in such quantities that it hardens or, as it were, "tans" the pellicle (which lines the inside of the shell) and imparts a disagreeable astringent flavor to the egg. The process hereinafter described remedies this objection and consists in using for the preservation of eggs and other aliments a mixture of formaline and odorless benzoic acid, the latter substance, besides its value as a preservative, serving to considerably lessen the quantity of formaline necessary to be used, the effect of which is that the disadvantage attending the use of formaline alone is obviated and the eggs or other aliments treated preserve their natural taste.

The substances are mixed in the following proportions: To make one liter of the mixture, take from one hundred cubic millimeters to two cubic centimeters of formaline and the same quantity of benzoic acid. Add one to ten cubic centimeters of alcohol and complete the quantity by the addition of water.

In the foregoing mixture the benzoic acid may be replaced by another antiseptic, such as boric acid, salicylic acid, or the like.

When it is desired to use this solution, the eggs or other foodstuffs are immersed therein. The length of time during which they should remain in the liquid depends upon the length of time during which they are to be stored and the climatic conditions of the country.

Experience has shown that by means of this process eggs can easily be kept for a year without having any effect upon their freshness and without destroying their natural flavor.

Having now fully described our invention, what we claim, and desire to secure by Letters Patent, is—

A process for preserving eggs and other aliments which consists in subjecting such eggs and aliments to the chemical action resultant from a combined solution of formaline one part, benzoic acid one part, and one to ten parts of alcohol in water, for a period proportionate to the climatic conditions and the duration of time such eggs and aliments are to be preserved.

In testimony whereof we have hereunto set our hands in presence of two witnesses.

JOHAN HERMAN VIERDAG.
WILLEM JAN HUBERT VERHEGGEN.
ROBERT HENDRIK ARNTZENIUS.
ANTOON FRANS JOSEPH BYVOET.

Witnesses:
AIRE H. VOORWINDEN,
J. D. FÜHRINA.